Jan. 8, 1924.
W. HOFFMAN
PORTABLE BUFFING TOOL
Filed Jan. 16, 1922
1,480,263
2 Sheets-Sheet 1
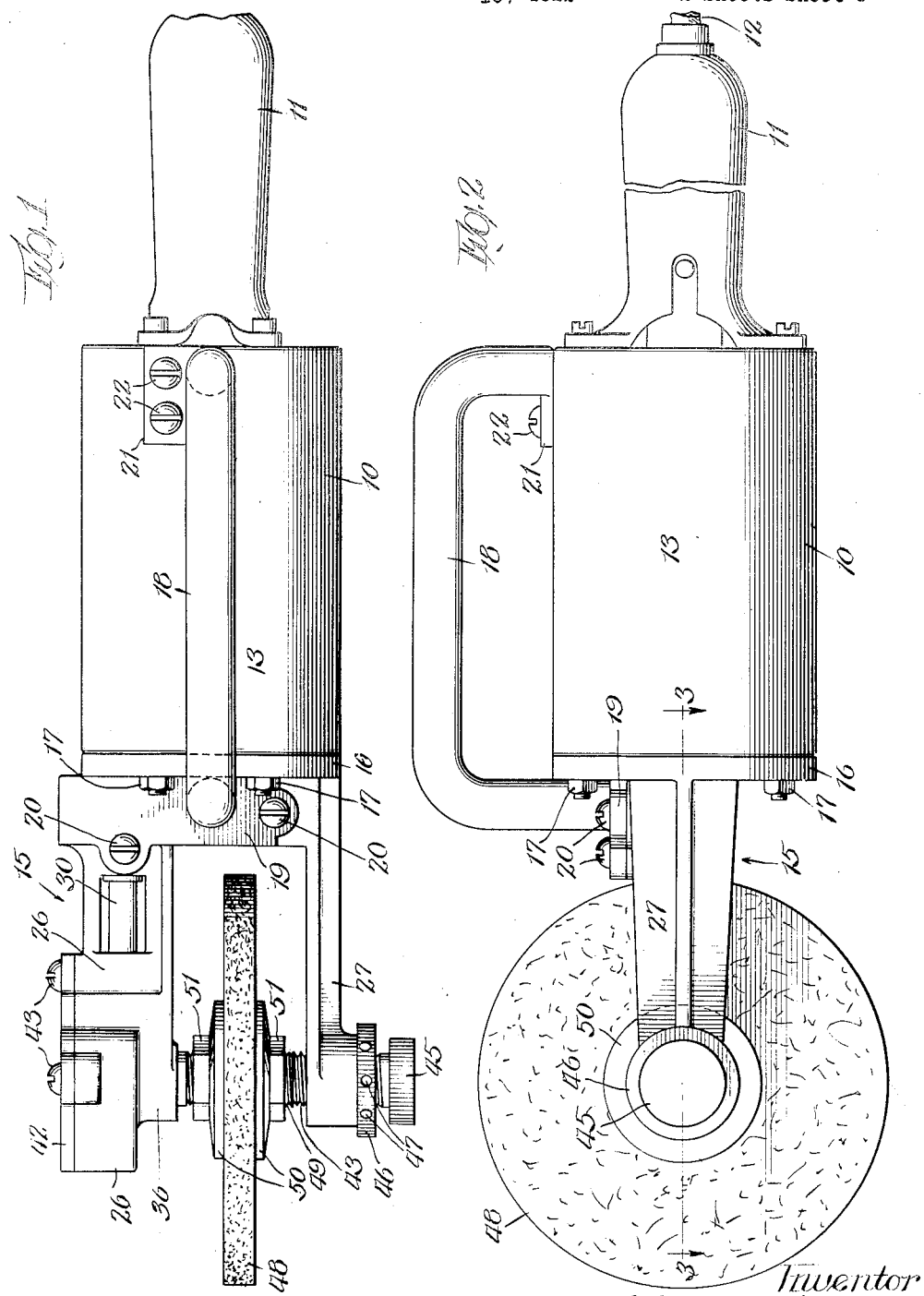

Jan. 8, 1924. 1,480,263
W. HOFFMAN
PORTABLE BUFFING TOOL
Filed Jan. 16, 1922   2 Sheets-Sheet 2
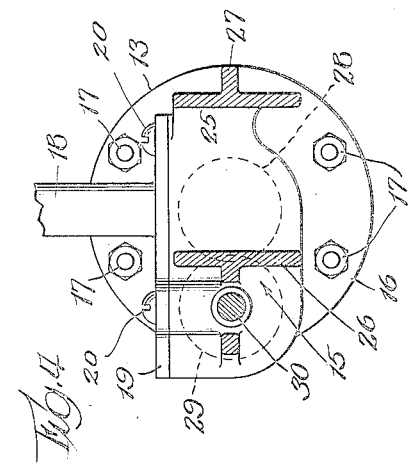
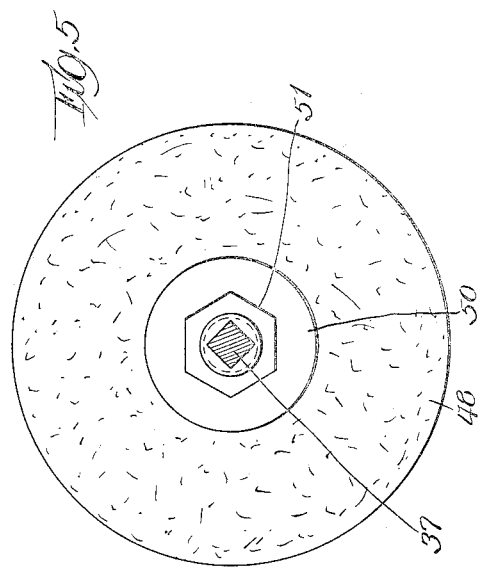
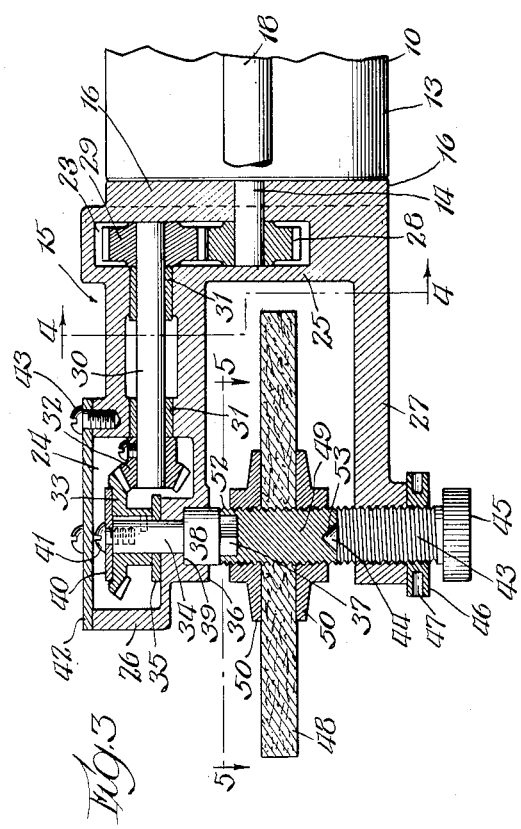
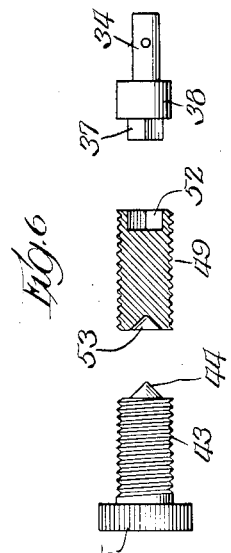
Inventor
Willie Hoffman,
by Charles O. Shurvey
Atty.

Patented Jan. 8, 1924.

1,480,263

UNITED STATES PATENT OFFICE.

WILLIE HOFFMAN, OF CHICAGO, ILLINOIS.

PORTABLE BUFFING TOOL.

Application filed January 16, 1922. Serial No. 529,724.

*To all whom it may concern:*

Be it known that I, WILLIE HOFFMAN, a citizen of the United States, and a resident of Chicago, Cook County, and State of Illinois, have invented certain new and useful Improvements in Portable Buffing Tools, of which the following is declared to be a full, clear, and exact description.

This invention relates to portable buffing tools, and its principal object is to provide an attachment which may be readily attached to a portable electric motor, and containing drive mechanism arranged to be driven by the motor, and a tool mount driven by the drive mechanism of the attachment and arranged to hold the tool in a plane parallel with the axis of the motor. Another object is to provide an attachment in which the tool mount may be quickly and readily disconnected therefrom and replaced by another whereby any of a number of tools may be coupled up with the motor and driven thereby. While the device is herein shown and described in connection with a buffing wheel, it is to be understood that its use is not limited thereto, as it may be used equally as well for operating a saw, a grinding wheel, an emery wheel, a wire brush, etc.

The invention consists in the several novel features hereinafter fully set forth and claimed.

The invention is clearly illustrated in the drawings accompanying this specification, in which:

Fig. 1 is a plan of a portable buffing tool embodying a simple form of the present invention; Fig. 2 is a side elevation thereof; Fig. 3 is a longitudinal section taken on line 3—3 of Fig. 2; Fig. 4 is a detail cross-section, taken on line 4—4 of Fig. 3; Fig. 5 is a detail side elevation of the buffing wheel, the tool holder being shown in cross-section, and the line of section being indicated at 5—5 in Fig. 3, and Fig. 6 is a view partly in side elevation and partly in central section of the tool holding means, and tool driving shaft, the parts being detached from each other to more clearly illustrate them.

Referring to said drawings, which illustrate one embodiment of the present invention, the reference character 10 designates a portable motor of common and well known construction, such as is employed for operating drills and other tools. A handle 11 at one end of the motor is usually employed, and the electric conductor cords 12 are connected up to the motor and run to a suitable source of electric supply, as is well understood. Protruding from one end of the casing 13 of the motor is a driven spindle or shaft 14, to which the ordinary working tools are attached in ordinary use.

One main object of this invention is to provide a tool such for instance as a buffing wheel mounted to rotate on an axis at right angles to the axis of the spindle 14, whereby the tool may be more readily brought into engagement with objects and whereby the necessary pressure against said objects may be obtained by applying force lengthwise of the motor, or in other words in a direction parallel with the axis of the motor. To obtain this result, I have provided a gear casing 15 of novel construction, which is arranged to be readily attached to the casing of the motor. In its preferred form, said gear casing is formed with a base 16 which is secured to the front end of the motor casing 13 by bolts and nuts 17. A handle 18 is associated with the gear casing 15 and extends up over the motor casing 13, in convenient position to act as a handle for the tool. As a preference the handle 18 is formed at one end with a flattened part 19, which is secured to the gear casing by screws 20, and at its other end it is formed with a lug 21, which is secured to the motor casing by screws 22.

The gear casing 15 is cored out to provide chambers 23, 24, for the reception of the gearing of the attachment. The chamber 23 extends transversely of the device in a housing portion 25, and the chamber 24 extends lengthwise of the device in a housing portion 26. The housing portion 26 also forms one of a pair of forks or arms 26, 27, in which tool mounting means is held.

The drive gearing between the motor spindle 14 and tool will now be described. Secured on the spindle 14 in the chamber 23 is a spur pinion 28, which meshes with a spur pinion 29 fast on a shaft 30, and also contained in the chamber 23. The shaft 30 is journalled in bearing bushings 31, secured in the housing portion 26 and extends into the chamber 24, where it has a beveled pinion 32 secured on it, which meshes with a beveled gear wheel 33 that is mounted on a short tool driving shaft 34 which is journalled in the housing 26 and protrudes from a boss 36 formed thereon. Its outer end is squared, as at 37, for engagement with the tool mount, and it has a shouldered portion 38 which bears against a shouldered portion 39 of the boss 36. This prevents endwise movement of the short tool driving shaft 34 in one direction, and a washer or disc 40, secured upon the other end of the shaft 34 by a screw 41, and bearing against the end face of the beveled gear wheel 33 prevents endwise movement of the shaft 34 in the other direction, inasmuch as the hub of the beveled gear wheel 33 bears against the bushing 35. The cavity or chamber 24 opens out at a place opposite the beveled pinion 32 and gear wheel 33, and the opening is closed by a cover 42 secured to the housing by screws 43. The cavities 23, 24, may be packed with grease or other lubricant, as is well understood.

Threadedly secured in the fork or arm 27 in axial alignment with the shaft 34 is a tool holding screw 43, which has a tapered inner end 44, and a knurled head 45 on its outer end. A lock nut 46 on the screw 43 is arranged to bear against the outer face of the fork 27 to lock the screw 43 in place. Conveniently, sockets or recesses 47 may be provided in the peripheral face of the locknut 46 into which may be inserted a pin, nail or other like object for turning the locknut tightly against the fork 27.

The working tool 48 may be in the form of a buffing wheel, a circular saw, emery wheel, a grinding wheel, etc. and if desired, the device may be supplied with an assortment of such working tools. The tool mounting means comprises a threaded arbor 49 and two clamping discs 50 threadedly secured upon said arbor, one on either side of the tool 48. The tool has a central hole through which the arbor is inserted after which the clamping discs 50 are screwed up tightly against the tool. A hexagonal, or other many sided hub 51 is provided upon each clamping disc, to which a wrench may be applied in tightening up the discs against the tool. One end of the arbor is formed with a square or non-circular recess or socket 52 adapted for engagement with the square or non-circular end 37 of the short driving shaft 34, and a conical recess or socket 53 is formed in the other end of the arbor for the reception of the tapered or conical end of the screw.

The tool, with its tool mount, may be readily attached to the device by screwing back the screw 43, then bringing the arbor into operative engagement with the square end of the shaft 34, and turning the screw 43 into the conical socket 53 and setting up the lock nut 46. Other tools may be substituted for the buffing wheel and these other tools may be mounted on tool mounts like the one shown, ready for attachment to the device.

The electric current being turned on, the tool may be used for buffing, sawing, polishing or grinding surfaces by pressing the working tool against the object to be operated on, and moving it across the same as is well understod. It is particularly useful in working on immovable objects, or objects that cannot be handled readily. The particular advantage of mounting the working tool on an axis at right angles to the length of the device is that the tool rotates in a plane parallel with lines of force applied to the tool in a line lengthwise of itself. The user can therefore press the working tool firmly against the object and can easily apply it in corners and other places not otherwise accessible. The user can easily support the tool by holding the handle 18 with one hand and can readily guide it with said handle and with the other handle 11.

More or less variation of the exact details of construction is possible without departing from the spirit of this invention; I desire, therefore, not to limit myself to the exact form of the construction shown and described, but intend in the following claims to point out all of the invention disclosed herein.

I claim as my invention, and desire to secure by Letters Patent:

1. A portable electric motor operated hand tool, comprising an electric motor, including its casing, its motor driven shaft at one end, and a handle at its other end, and an attachment for converting said motor into a handtool, comprising a forked gear casing secured to said motor casing, a tool driving shaft extending transversely of said motor driven shaft, journaled solely in one fork of said gear casing and secured therein against endwise movement, said tool driving shaft projecting into the space between the forks of said gear casing, a tool holding screw threadedly secured in the other fork of the gear casing, and coaxial with said tool driving shaft, a rotative working tool located between said forks and extending in a plane parallel with the axis of the motor, and being operatively connectible with and disconnectible from said tool driving shaft, and with said screw, and gearing between said motor driven shaft and tool driving shaft contained in the fork of said gear casing which contains said tool driving shaft.

2. In a portable, electric motor operated hand tool, a combined gear casing and tool supporting arm secured thereto, a tool driving shaft journalled in said casing and secured therein against endwise movement, said tool driving shaft having an outer squared end, a rotative working tool, a threaded arbor extending through said tool, and having one end formed with a squared socket held in connected engagement with said drive shaft, clamping discs threadedly secured on said arbor and clamping said tool therebetween, and a screw mounted in said arm and having a tapered end entering a tapered recess in said arbor.

WILLIE HOFFMAN.